(12) United States Patent  
Pfau

(10) Patent No.: US 11,142,215 B2  
(45) Date of Patent: *Oct. 12, 2021

(54) PROCESSING UNIT AND PROCESSING METHOD FOR INTER-VEHICULAR DISTANCE WARNING SYSTEM, INTER-VEHICULAR DISTANCE WARNING SYSTEM, AND MOTORCYCLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 90 days.

This patent is subject to a terminal disclaimer.

(21) Appl. No.: 16/620,973

(22) PCT Filed: May 15, 2018

(86) PCT No.: PCT/IB2018/053370  
§ 371 (c)(1),  
(2) Date: Dec. 10, 2019

(87) PCT Pub. No.: WO2018/229566  
PCT Pub. Date: Dec. 20, 2018

(65) Prior Publication Data  
US 2020/0198653 A1   Jun. 25, 2020

(30) Foreign Application Priority Data

Jun. 12, 2017  (JP) .............................. JP2017-115129

(51) Int. Cl.  
*B62J 45/415*   (2020.01)  
*B60W 50/14*   (2020.01)  
*G08G 1/16*   (2006.01)

(52) U.S. Cl.  
CPC ............. *B60W 50/14* (2013.01); *G08G 1/166* (2013.01); *B60W 2050/143* (2013.01); *B60W 2300/36* (2013.01)

(58) Field of Classification Search  
CPC ........... B60W 50/14; B60W 2050/143; B60W 2300/36; B60W 2520/10; B60W 2554/802; B60W 2520/18; G08G 1/166  
See application file for complete search history.

(56) References Cited

U.S. PATENT DOCUMENTS

2010/0079270 A1* 4/2010 Krautter ................. B60K 35/00  
340/436  
2016/0133131 A1* 5/2016 Grimm ............ G08G 1/096725  
701/117

(Continued)

FOREIGN PATENT DOCUMENTS

CN    104302527 A    1/2015  
CN    106139563 A    11/2016

(Continued)

OTHER PUBLICATIONS

International Search Report for Application No. PCT/IB2018/053370 dated Aug. 20, 2018 (English Translation, 2 pages).

*Primary Examiner* — Munear T Akki  
(74) *Attorney, Agent, or Firm* — Michael Best & Friedrich LLP

(57) ABSTRACT

The invention obtains a processing unit and a processing method capable of improving a rider's safety. The invention also obtains an inter-vehicular distance warning system that includes the processing unit. The invention further obtains a motorcycle that includes the inter-vehicular distance warning system.

A processing unit (20) includes: an acquisition section (21) that acquires environment information corresponding to output of an environment detector (11); a determination section (22) that determines sufficiency or insufficiency of an inter-vehicular distance on the basis of the environment information; and a control section (23) that makes a warning device (30) output a warning in the case where the deter- (Continued)

mination section (22) determines that the inter-vehicular distance is insufficient. During travel of the motorcycle, the acquisition section (21) acquires posture information related to a bank angle of the motorcycle, and the control section (23) changes the warning output by the warning device (30) in accordance with the posture information.

15 Claims, 3 Drawing Sheets

(56) References Cited

U.S. PATENT DOCUMENTS

| | | | |
|---|---|---|---|
| 2016/0267763 A1 | 9/2016 | Allen et al. | |
| 2017/0225619 A1* | 8/2017 | Torii | G08G 1/167 |
| 2018/0194282 A1* | 7/2018 | Wolterman | B60W 50/0097 |
| 2019/0271543 A1* | 9/2019 | Serita | B60L 15/10 |
| 2020/0331460 A1* | 10/2020 | Igari | B60W 30/04 |
| 2021/0031856 A1* | 2/2021 | Calley | B62J 50/23 |

FOREIGN PATENT DOCUMENTS

| | | |
|---|---|---|
| CN | 106740108 A | 5/2017 |
| DE | 102007053274 | 5/2009 |
| EP | 3176062 | 6/2017 |
| JP | 2004299505 A | 10/2004 |
| JP | 2009116882 | 5/2009 |
| JP | 2016034819 A | 3/2016 |
| WO | 0023316 A1 | 4/2000 |

\* cited by examiner

PROCESSING UNIT AND PROCESSING METHOD FOR INTER-VEHICULAR DISTANCE WARNING SYSTEM, INTER-VEHICULAR DISTANCE WARNING SYSTEM, AND MOTORCYCLE

BACKGROUND OF THE INVENTION

The invention relates to a processing unit and a processing method for an inter-vehicular distance warning system that recognizes insufficiency of an inter-vehicular distance between a traveling motorcycle and a preceding vehicle by using an environment detector provided in the motorcycle and warns a rider, an inter-vehicular distance warning system that includes the processing unit, and a motorcycle that includes the inter-vehicular distance warning system.

As a technique related to a motorcycle (a two-wheeled motor vehicle or a three-wheeled motor vehicle), an inter-vehicular distance warning system that recognizes insufficiency of an inter-vehicular distance between a traveling motorcycle and a preceding vehicle and warns a rider has been known. The inter-vehicular distance warning system acquires environment information that corresponds to output of an environment detector provided in the motorcycle and makes a warning device output a warning when determining that the inter-vehicular distance is insufficient on the basis of the environment information. The rider's operation is assisted by the warning that is output by the warning device (for example, see JP-A-2009-116882).

SUMMARY OF THE INVENTION

In the conventional inter-vehicular distance warning system, there is a case where the warning device outputs such a warning that surprises the rider in a state where the motorcycle turns, that is, in a state where a large bank angle is generated in the motorcycle and a vehicle body becomes unstable. Thus, the rider's safety is possibly affected.

The invention has been made with the above-described problem as the background and therefore obtains a processing unit and a processing method capable of improving a rider's safety. The invention also obtains an inter-vehicular distance warning system that includes the processing unit. The invention further obtains a motorcycle that includes the inter-vehicular distance warning system.

A processing unit according to the invention is a processing unit for an inter-vehicular distance warning system that recognizes insufficiency of an inter-vehicular distance between a traveling motorcycle and a preceding vehicle by using an environment detector provided in said motorcycle and warns a rider. The processing unit includes: an acquisition section that acquires environment information corresponding to output of the environment detector; a determination section that determines sufficiency or insufficiency of an inter-vehicular distance on the basis of the environment information; and a control section that makes a warning device output a warning in the case where the determination section determines that the inter-vehicular distance is insufficient. During travel of the motorcycle, the acquisition section acquires posture information related to a bank angle of the motorcycle, and the control section changes the warning output by the warning device in accordance with the posture information.

An inter-vehicular distance warning system according to the invention includes the above processing unit, the environment detector, and the warning device.

A motorcycle according to the invention includes the above inter-vehicular distance warning system.

A processing method according to the invention is a processing method for an inter-vehicular distance warning system that recognizes insufficiency of an inter-vehicular distance between a traveling motorcycle and a preceding vehicle by using an environment detector provided in said motorcycle and warns a rider. The processing method includes: an acquisition step of acquiring environment information corresponding to output of the environment detector; a determination step of determining sufficiency or insufficiency of the inter-vehicular distance on the basis of the environment information; and a control step of making a warning device output a warning in the case where it is determined that the inter-vehicular distance is insufficient in the determination step. During travel of the motorcycle, in the acquisition step, posture information related to a bank angle of the motorcycle is acquired, and in the control step, the warning output by the warning device is changed in accordance with the posture information.

In the processing unit, the inter-vehicular distance warning system, the motorcycle, and the processing method according to the invention, the warning output by the warning device is changed in accordance with the posture information related to the bank angle of the motorcycle. Therefore, in a state where the motorcycle turns, that is, in a state where the large bank angle is generated in the motorcycle and a vehicle body becomes unstable, the warning device outputs the appropriate warning, and thus the rider's safety can be improved.

DETAILED DESCRIPTION

Figure 1:
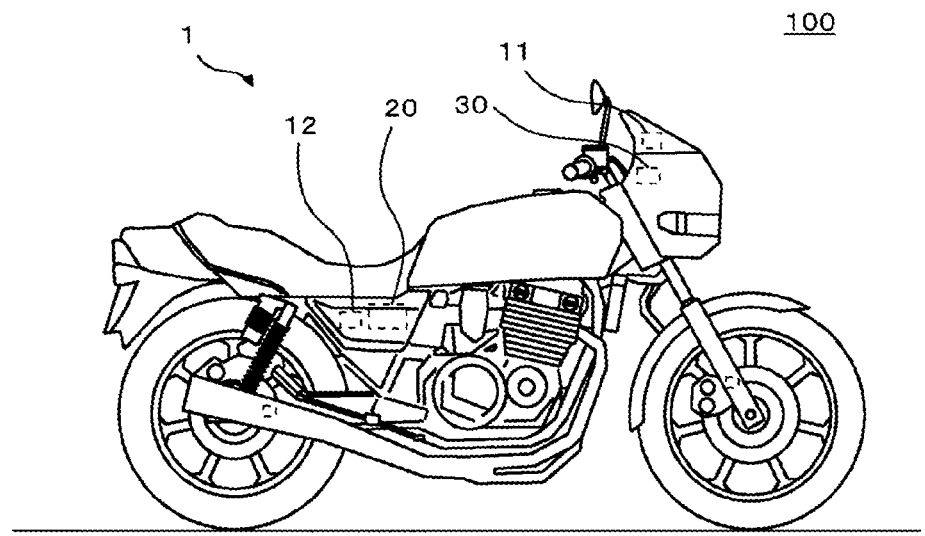
FIG. 1 is a view of a state where an inter-vehicular distance warning system according to a first embodiment of the invention is mounted on a motorcycle.

A description will hereinafter be made on a processing unit, an inter-vehicular distance warning system, a motorcycle, and a processing method according to the invention by using the drawings.

Note that each of a configuration, an operation, and the like, which will be described below, is merely one example, and the processing unit, the inter-vehicular distance warning system, the motorcycle, and the processing method according to the invention are not limited to a case with such a configuration, such an operation, and the like.

For example, a description will hereinafter be made on a case where the motorcycle is a two-wheeled motor vehicle; however, the motorcycle may be a three-wheeled motor vehicle.

The same or similar description will appropriately be simplified or will not be made below. In the drawings, the same or similar portions will be denoted by the same reference signs. In addition, a detailed structure will appropriately be depicted in a simplified manner or will not be depicted.

First Embodiment

A description will hereinafter be made on an inter-vehicular distance warning system according to a first embodiment.

<Configuration of Inter-Vehicular Distance Warning System>

A description will be made on a configuration of the inter-vehicular distance warning system according to the first embodiment.

Figure 2:
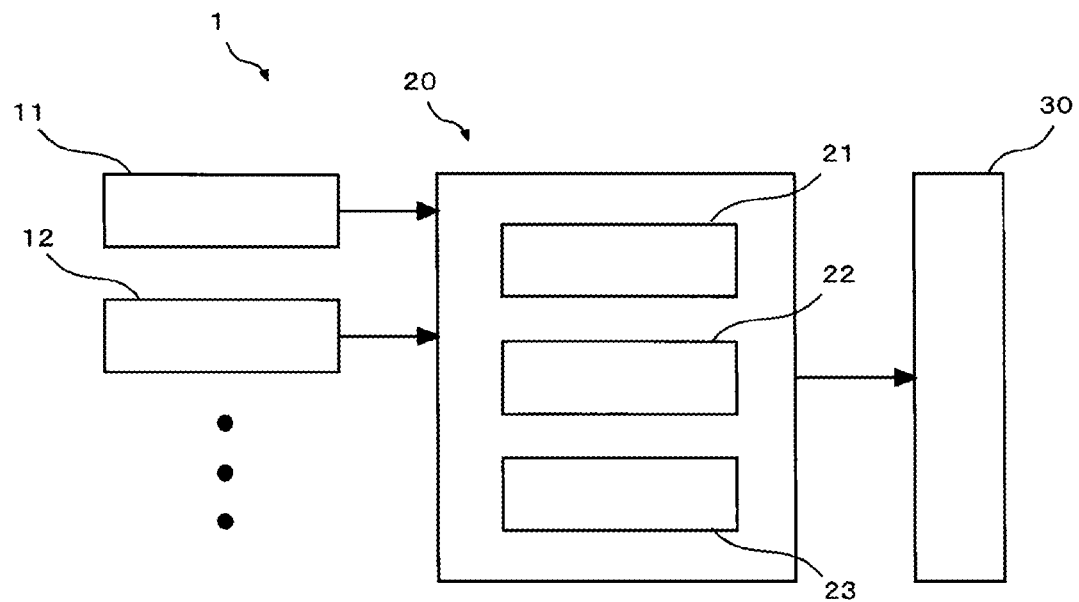
FIG. 2 is a system configuration diagram of the inter-vehicular distance warning system according to the first embodiment of the invention.
Figure 3:
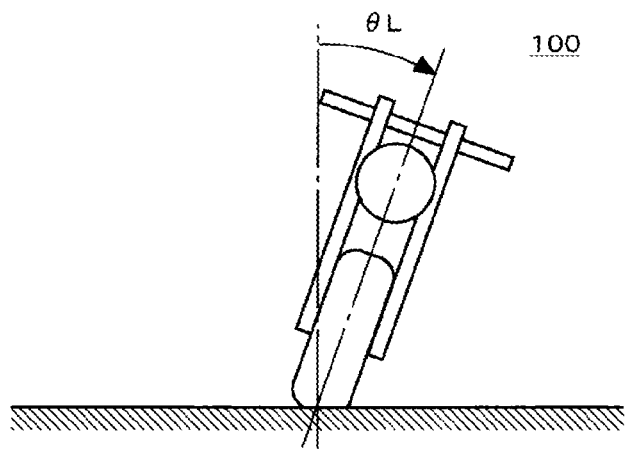
FIG. 3 is a view illustrating a definition of a bank angle of the motorcycle.

FIG. 1 is a view of a state where the inter-vehicular distance warning system according to the first embodiment of the invention is mounted on a motorcycle. FIG. 2 is a system configuration diagram of the inter-vehicular distance warning system according to the first embodiment of the invention. FIG. 3 is a view illustrating a definition of a bank angle of the motorcycle.

As depicted in FIG. 1 and FIG. 2, an inter-vehicular distance warning system 1 is mounted on a motorcycle 100. The inter-vehicular distance warning system 1 at least includes an environment detector 11 that detects the front of the motorcycle 100, an inertial measurement unit (IMU) 12 that detects inertia generated in the motorcycle 100, a processing unit (an ECU) 20, and a warning device 30.

The inter-vehicular distance warning system 1 plays a role of recognizing insufficiency of an inter-vehicular distance between the traveling motorcycle 100 and a preceding vehicle by using the environment detector 11 and a role of warning a rider by using the warning device 30. The processing unit 20 acquires output of the environment detector 11 and output of the inertial measurement unit 12, and outputs a control command to the warning device 30. The processing unit 20 also receives output of various detectors (not depicted) used to acquire travel state information of the motorcycle 100, the rider's operation state information, and the like, for example. Each device of the inter-vehicular distance warning system 1 may exclusively be used in the inter-vehicular distance warning system 1 or may also be used in another system.

The environment detector 11 is a radar, a Lidar, an ultrasonic sensor, a camera, or the like, for example, and continuously detects a peripheral object(s) within a detection range during travel of the motorcycle 100.

The inertial measurement unit 12 includes a three-axis gyroscope sensor and a three-directional acceleration sensor, for example, and outputs the detected inertia to the processing unit 20. The inertial measurement unit 12 may detect another physical quantity that can substantially be converted to the inertia generated in the motorcycle 100. Alternatively, the inertial measurement unit 12 may be another detector that can acquire posture information related to a bank angle $\theta L$ of the motorcycle 100.

The processing unit 20 includes an acquisition section 21, a determination section 22, and a control section 23. The sections of the processing unit 20 may collectively be provided in a single casing or may separately be provided in multiple casings. In addition, the processing unit 20 may partially or entirely be constructed of a microcomputer, a microprocessor unit, or the like, may be constructed of a member in which firmware and the like can be updated, or may be a program module or the like that is executed by a command from a CPU or the like, for example.

During the travel of the motorcycle 100, the acquisition section 21 receives the output of the environment detector 11 and acquires environment information that corresponds to the output. The environment information at least includes distance information from the motorcycle 100 to the preceding vehicle. Then, the determination section 22 determines whether the inter-vehicular distance between the motorcycle 100 and the preceding vehicle is insufficient by using a known method. More specifically, the determination section 22 processes the environment information and determines whether the inter-vehicular distance between the motorcycle 100 and the preceding vehicle is insufficient in consideration of the travel state information of the motorcycle 100, the rider's operation state information, and the like that are acquired by using the various detectors. Then, in the case where the determination section 22 determines that the inter-vehicular distance is insufficient, the control section 23 makes the warning device 30 output a warning.

In addition, the acquisition section 21 acquires the posture information related to the bank angle $\theta L$ of the motorcycle 100 on the basis of the output of the inertial measurement unit 12. The posture information related to the bank angle $\theta L$ may be information of the bank angle $\theta L$ itself or information of another physical quantity that can substantially be converted to the bank angle $\theta L$ (for example, a yaw rate, lateral acceleration, or the like generated in the motorcycle 100). The bank angle $\theta L$ is defined as a tilt angle of the motorcycle 100 in a rolling direction with respect to a state where the motorcycle 100 stands upright (see FIG. 3).

The warning device 30 may warn the rider by sound (that is, a sensation through an auditory organ as a sensory organ), may warn the rider by a display (that is, a sensation through a visual organ as the sensory organ), may warn the rider by vibrations (that is, a sensation through a tactile organ as the sensory organ), or may warn the rider by a combination of those. More specifically, the warning device 30 is a speaker, a display, a lamp, a vibrator, or the like, and may be provided in the motorcycle 100 or may be provided in an accessory such as a helmet that is associated with the motorcycle 100. In addition, the warning device 30 may be constructed of a single output device or may be constructed of multiple output devices of the same type or different types. The multiple output devices may be provided integrally or may be provided separately.

<Operation of Inter-Vehicular Distance Warning System>

A description will be made on an operation of the inter-vehicular distance warning system according to the first embodiment.

Figure 4:
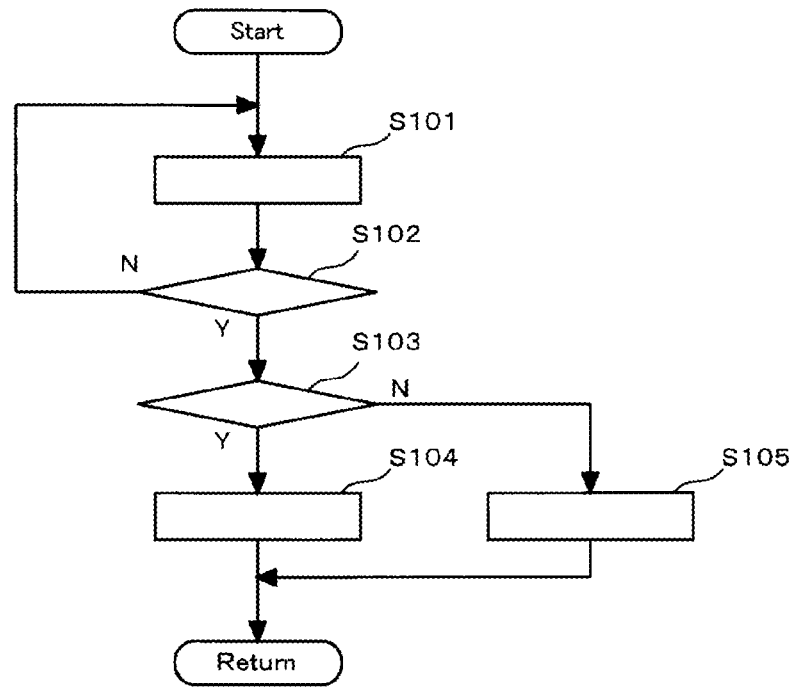
FIG. 4 is a chart of an operation flow of a processing unit in the inter-vehicular distance warning system according to the first embodiment of the invention.

FIG. 4 is a chart of an operation flow of the processing unit in the inter-vehicular distance warning system according to the first embodiment of the invention.

The processing unit 20 executes the operation flow depicted in FIG. 4 during the travel of the motorcycle 100.

(Acquisition Step)

In step S101, the acquisition section 21 acquires the environment information that corresponds to the output of the environment detector 11. In addition, the acquisition section 21 acquires the posture information related to the bank angle $\theta L$ on the basis of the output of the inertial measurement unit 12.

(Determination Step)

In step S102, the determination section 22 processes the environment information acquired in step S101 and acquires the inter-vehicular distance between the motorcycle 100 and the preceding vehicle. In addition, the determination section 22 acquires a minimum allowable inter-vehicular distance in consideration of the travel state information of the motorcycle 100, the rider's operation state information, and the like that are acquired by using the various detectors. Note that the minimum allowable inter-vehicular distance is usually set to be longer as a vehicle body speed of the motorcycle 100 is increased. Then, the determination section 22 determines whether the inter-vehicular distance between the motorcycle 100 and the preceding vehicle is shorter than the minimum allowable inter-vehicular distance for reference duration or longer. If Yes, the processing proceeds to step S103. If No, the processing returns to step S101.

(Control Step)

In step S103 to step S105, the control section 23 makes the warning device 30 output the warning in a mode that corresponds to the posture information acquired in step S101.

More specifically, in step S103, the control section 23 determines whether the posture information acquired in step S101 is posture information corresponding to the bank angle $\theta L$ that is smaller than a maximum allowable bank angle $\theta Lth1$. If Yes, the processing proceeds to step S104. If No, the processing proceeds to step S105.

In step S104, the control section 23 makes the warning device 30 output the warning. In step S105, the control section 23 does not make the warning device 30 output the warning. In the case where a state where the determination of Yes is made in step S102 and the determination of No is made in step S103 continues for reference duration or longer, the control section 23 may make the warning device 30 output the warning.

<Effects of Inter-Vehicular Distance Warning System>

A description will be made on effects of the inter-vehicular distance warning system according to the first embodiment.

The processing unit 20 includes: the acquisition section 21 that acquires the environment information corresponding to the output of the environment detector 11; the determination section 22 that determines sufficiency or insufficiency of the inter-vehicular distance on the basis of the environment information; and the control section 23 that makes the warning device 30 output the warning in the case where the determination section 22 determines that the inter-vehicular distance is insufficient. During the travel of the motorcycle 100, the control section 23 changes the warning output by the warning device 30 in accordance with the posture information related to the bank angle $\theta L$ of the motorcycle 100. Therefore, in a state where the motorcycle 100 turns, that is, in a state where the large bank angle $\theta L$ is generated in the motorcycle 100 and a vehicle body becomes unstable, the warning device 30 outputs the appropriate warning, and thus the rider's safety can be improved.

In the case where the acquisition section 21 acquires the posture information corresponding to the bank angle $\theta L$ that is smaller than the maximum allowable bank angle $\theta Lth1$, the control section 23 preferably makes the warning device 30 output the warning. In the case where the acquisition section 21 acquires the posture information corresponding to the bank angle $\theta L$ that is larger than the maximum allowable bank angle $\theta Lth1$, the control section 23 preferably does not make the warning device 30 output the warning. In this way, the rider's safety is reliably improved.

In particular, in the case where the state where the determination section 22 determines that the inter-vehicular distance is insufficient and the acquisition section 21 acquires the posture information corresponding to the bank angle $\theta L$ that is larger than the maximum allowable bank angle $\theta Lth1$ continues for the reference duration or longer, the control section 23 preferably makes the warning device 30 output the warning. With such a configuration, the rider's operation can be assisted while the rider's safety is improved.

Second Embodiment

A description will hereinafter be made on an inter-vehicular distance warning system according to a second embodiment.

Note that the inter-vehicular distance warning system according to the second embodiment differs from the inter-vehicular distance warning system according to the first embodiment only in terms of the operation flow of the processing unit 20. A description that overlaps or is similar to the description on the inter-vehicular distance warning system according to the first embodiment will appropriately be simplified or will not be made.

<Operation of Inter-Vehicular Distance Warning System>

A description will be made on an operation of the inter-vehicular distance warning system according to the second embodiment.

Figure 5:
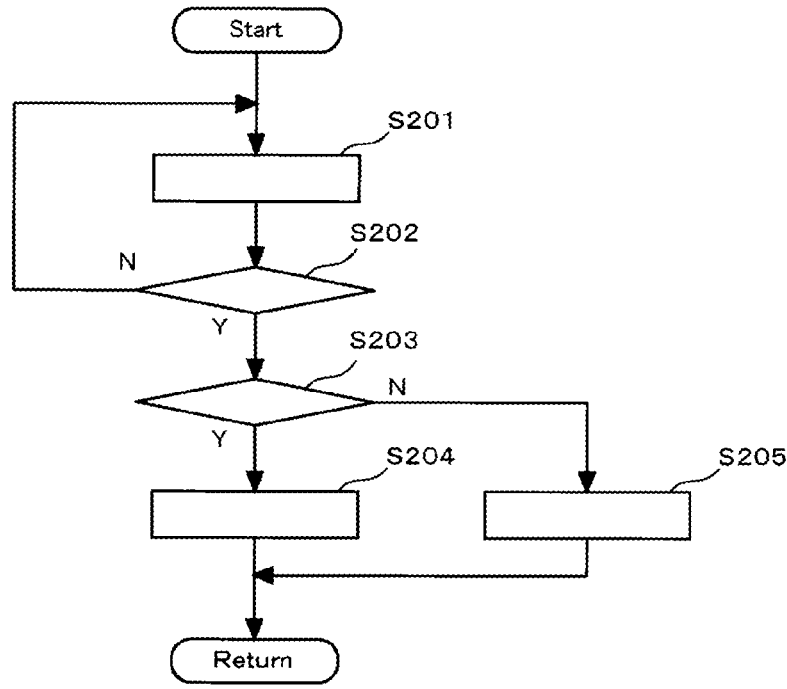
FIG. 5 is a chart of an operation flow of a processing unit in an inter-vehicular distance warning system according to a second embodiment of the invention.

FIG. 5 is a chart of the operation flow of the processing unit in the inter-vehicular distance warning system according to the second embodiment of the invention.

The processing unit 20 executes the operation flow depicted in FIG. 5 during the travel of the motorcycle 100.

(Acquisition Step)

In step S201, the acquisition section 21 acquires the environment information that corresponds to the output of the environment detector 11. In addition, the acquisition section 21 acquires the posture information related to the bank angle $\theta L$ on the basis of the output of the inertial measurement unit 12.

(Determination Step)

In step S202, the determination section 22 processes the environment information acquired in step S201 and acquires the inter-vehicular distance between the motorcycle 100 and the preceding vehicle. In addition, the determination section 22 acquires the minimum allowable inter-vehicular distance in consideration of the travel state information of the motorcycle 100, the rider's operation state information, and the like that are acquired by using the various detectors. Note that the minimum allowable inter-vehicular distance is usually set to be longer as the vehicle speed of the motorcycle 100 is increased. Then, the determination section 22 determines whether the inter-vehicular distance between the motorcycle 100 and the preceding vehicle is shorter than the minimum allowable inter-vehicular distance for the reference duration or longer. If Yes, the processing proceeds to step S203. If No, the processing returns to step S201.

(Control Step)

In step S203 to step S205, the control section 23 makes the warning device 30 output the warning in a mode that corresponds to the posture information acquired in step S201.

More specifically, in step S203, the control section 23 determines whether the posture information acquired in step S201 is posture information corresponding to the bank angle $\theta L$ that is smaller than a reference bank angle $\theta Lth2$. If Yes, the processing proceeds to step S204. If No, the processing proceeds to step S205.

For example, in step S204, the control section 23 makes the warning device 30 output first warning sound in a first volume level. In step S205, the control section 23 makes the warning device 30 output second warning sound in a second volume level that is lower than the first volume level. That is, the second warning sound is a warning with lower sensitivity than the first warning sound. The second warning sound may be warning sound whose volume level is gradually increased with a lapse of time. The first warning sound corresponds to the "first warning" in the invention, and the second warning sound corresponds to the "second warning" in the invention. The volume level corresponds to the "intensity" in the invention.

For example, in step S204, the control section 23 makes the warning device 30 output a first warning display in first brightness. In step S205, the control section 23 makes the warning device 30 output a second warning display in second brightness that is lower than the first brightness. That is, the second warning display is a warning with the lower sensitivity than the first warning display. The second warning display may be a warning display whose brightness is gradually increased with the lapse of time. The first warning display corresponds to the "first warning" in the invention, and the second warning display corresponds to the "second warning" in the invention. The brightness corresponds to the "intensity" in the invention.

For example, in step S204, the control section 23 makes the warning device 30 output a first warning vibration in a first amplitude. In step S205, the control section 23 makes the warning device 30 output a second warning vibration in a second amplitude that is smaller than the first amplitude. That is, the second warning vibration is a warning with the lower sensitivity than the first warning vibration. The second warning vibration may be a warning vibration whose amplitude is gradually increased with the lapse of time. The first warning vibration corresponds to the "first warning" in the invention, and the second warning vibration corresponds to the "second warning" in the invention. The amplitude corresponds to the "intensity" in the invention.

For example, in step S204, the control section 23 makes the warning device 30 output the first warning sound whose volume level changes in a first cycle. In step S205, the control section 23 makes the warning device 30 output the second warning sound whose volume level is changed in a second cycle that is longer than the first cycle. That is, the second warning sound is the warning with the lower sensitivity than the first warning sound. The second warning sound may be warning sound whose cycle in the volume level change is gradually shortened with the lapse of time. The first warning sound corresponds to the "first warning" in the invention, and the second warning sound corresponds to the "second warning" in the invention. The volume level change corresponds to the "change pattern" in the invention.

For example, in step S204, the control section 23 makes the warning device 30 output the first warning display whose brightness changes in the first cycle. In step S205, the control section 23 makes the warning device 30 output the second warning display whose brightness is changed in the second cycle that is longer than the first cycle. That is, the second warning display is the warning with the lower sensitivity than the first warning display. The second warning display may be a warning display whose cycle in the brightness change is gradually shortened with the lapse of time. The first warning display corresponds to the "first warning" in the invention, and the second warning display corresponds to the "second warning" in the invention. The brightness change corresponds to the "change pattern" in the invention.

For example, in step S204, the control section 23 makes the warning device 30 output the first warning vibration that vibrates in the first cycle. In step S205, the control section 23 makes the warning device 30 output the second warning vibration that vibrates in the second cycle that is longer than the first cycle. That is, the second warning vibration is the warning with the lower sensitivity than the first warning vibration. The second warning vibration may be a warning vibration whose cycle is gradually shortened with the lapse of time. The first warning vibration corresponds to the "first warning" in the invention, and the second warning vibration corresponds to the "second warning" in the invention. The vibration corresponds to the "change pattern" in the invention.

For example, in step S204, the control section 23 makes the warning device 30 output the warning by a first output device that outputs sound (preferably loud sound). In step S205, the control section 23 makes the warning device 30 output the warning by a second output device that outputs a display (preferably a less prominent display). That is, the warning by the second output device is a warning that is sensed by the rider through a different sensory organ from that used for the warning by the first output device. In addition, the warning by the second output device is the warning with the lower sensitivity than the warning by the first output device. The warning by the first output device corresponds to the "first warning" in the invention, and the warning by the second output device corresponds to the "second warning" in the invention.

For example, in step S204, the control section 23 makes the warning device 30 output the warnings by the first output device that outputs the sound and the second output device that outputs the display. In step S205, the control section 23 makes the warning device 30 output the warning by only the second output device. That is, the warning by the second output device in step S204 and step S205 is the warning that is sensed by the rider through the different sensory organ from that used for the warning by the first output device in step S204. The warning by the first output device in step S204 corresponds to the "first warning" in the invention, the warning by the second output device in step S204 corresponds to the "third warning" in the invention, and the warning by the second output device in step S205 corresponds to the "second warning" in the invention.

For example, in step S204, the control section 23 makes the warning device 30 output the warning by the first output device that outputs the vibration. In step S205, the control section 23 makes the warning device 30 output the warning by the second output device that outputs the sound or the display. That is, the warning by the second output device is a warning that is sensed by the rider through the different sensory organ from that used for the warning by the first output device. In addition, the warning by the second output device is the warning with the lower sensitivity than the warning by the first output device. Furthermore, the warning by the first output device applies an external force to the rider, and the warning by the second output device does not apply the external force to the rider. The warning by the first output device corresponds to the "first warning" in the invention, and the warning by the second output device corresponds to the "second warning" in the invention.

For example, in step S204, the control section 23 makes the warning device 30 output the warnings by the first output device that outputs the vibration and the second output device that outputs the sound or the display. In step S205, the control section 23 makes the warning device 30 output the warning by only the second output device. That is, the warning by the second output device in step S204 and step S205 is the warning that is sensed by the rider through the different sensory organ from that used for the warning by the first output device in step S204. The warning by the first output device in step S204 corresponds to the "first warning" in the invention, the warning by the second output device in step S204 corresponds to the "third warning" in the invention, and the warning by the second output device in step S205 corresponds to the "second warning" in the invention.

<Effects of Inter-Vehicular Distance Warning System>

A description will be made on effects of the inter-vehicular distance warning system according to the second embodiment.

In the case where the acquisition section 21 acquires the posture information corresponding to the bank angle θL that is smaller than the reference bank angle θLth2, the control section 23 preferably makes the warning device 30 output the first warning. In the case where the acquisition section 21 acquires the posture information corresponding to the bank angle θL that is larger than the reference bank angle θLth2, the control section 23 preferably makes the warning device 30 output the second warning that differs from the first warning. Therefore, the rider's operation can be assisted while the rider's safety is improved.

In particular, the second warning is preferably the warning with the lower sensitivity than the first warning. With such a configuration, the rider's safety is reliably improved. Furthermore, the second warning is preferably the warning whose sensitivity is gradually improved. With such a configuration, the assistance in the rider's operation can be promoted while the rider's safety is improved.

In addition, in particular, the second warning is preferably the warning that is sensed by the rider through the different sensory organ from that used for the first warning. With such a configuration, the rider's safety is reliably improved. Furthermore, the first warning is preferably the warning that applies the external force to the rider, and the second warning is preferably the warning that does not apply the external force to the rider. With such a configuration, in the state where the large bank angle θL is generated in the motorcycle 100 and the vehicle body becomes unstable, the application of the external force to the rider is suppressed. Therefore, the rider's operation can be assisted while the rider's safety is reliably improved.

Moreover, in particular, the second warning is preferably the warning that is sensed by the rider through the different sensory organ from that used for the first warning. In the case where the acquisition section 21 acquires the posture information corresponding to the bank angle θL that is smaller than the reference bank angle θLth2, the control section 23 preferably makes the warning device 30 output the third warning, which is sensed by the rider through the different sensory organ from that used for the first warning, in addition to the first warning. In the case where the acquisition section 21 acquires the posture information corresponding to the bank angle θL that is larger than the reference bank angle θLth2, the control section 23 preferably does not make the warning device 30 output the third warning. With such a configuration, the rider's operation can be assisted while the rider's safety is reliably improved. Furthermore, the second warning and the third warning are preferably the warnings that are sensed by the rider through the same sensory organ. With such a configuration, the rider can be suppressed from missing the second warning, and thus the rider's safety is further reliably improved.

Third Embodiment

A description will hereinafter be made on an inter-vehicular distance warning system according to a third embodiment.

Note that the inter-vehicular distance warning system according to the third embodiment differs from the inter-vehicular distance warning systems according to the first embodiment and the second embodiment only in terms of the operation flow of the processing unit 20. A description that overlaps or is similar to the descriptions on the inter-vehicular distance warning systems according to the first embodiment and the second embodiment will appropriately be simplified or will not be made.

<Operation of Inter-Vehicular Distance Warning System>

A description will be made on an operation of the inter-vehicular distance warning system according to the third embodiment.

Figure 6:
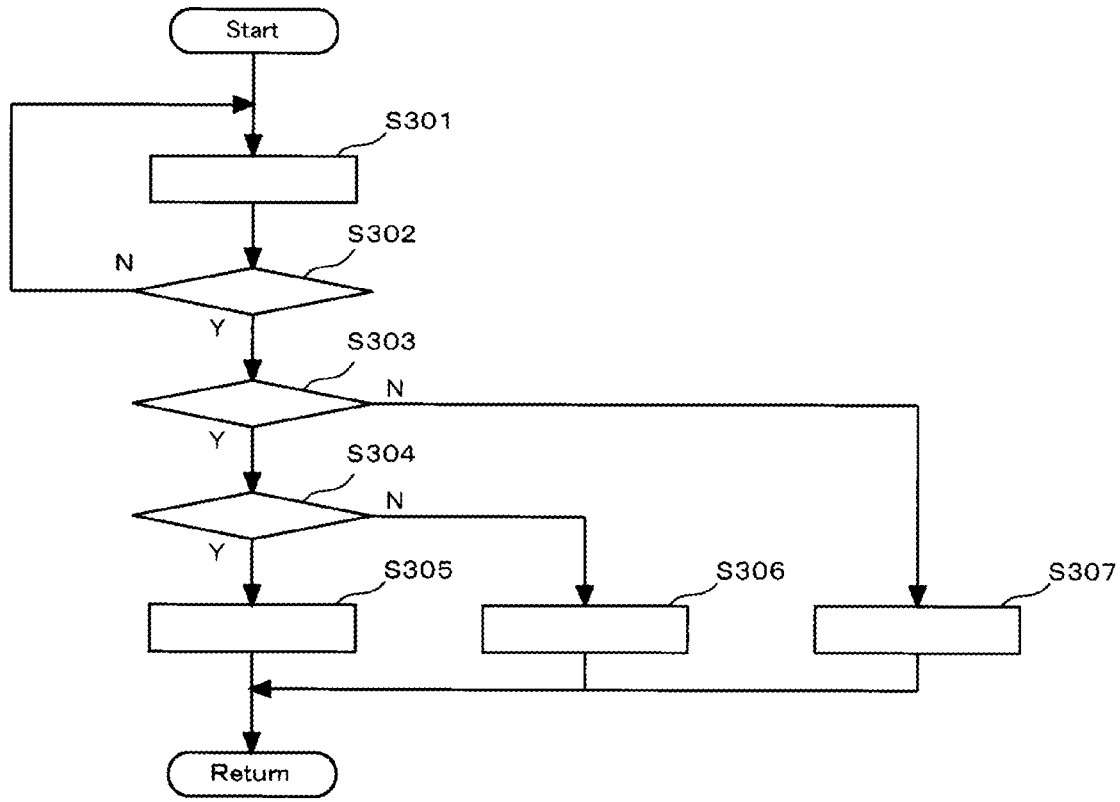
FIG. 6 is a chart of an operation flow of a processing unit in an inter-vehicular distance warning system according to a third embodiment of the invention.

FIG. 6 is a chart of the operation flow of the processing unit in the inter-vehicular distance warning system according to the third embodiment of the invention.

The processing unit 20 executes the operation flow depicted in FIG. 6 during the travel of the motorcycle 100.

(Acquisition Step)

In step S301, the acquisition section 21 acquires the environment information that corresponds to the output of the environment detector 11. In addition, the acquisition section 21 acquires the posture information related to the bank angle θL on the basis of the output of the inertial measurement unit 12.

(Determination Step)

In step S302, the determination section 22 processes the environment information acquired in step S301 and acquires the inter-vehicular distance between the motorcycle 100 and the preceding vehicle. In addition, the determination section 22 acquires the minimum allowable inter-vehicular distance in consideration of the travel state information of the motorcycle 100, the rider's operation state information, and the like that are acquired by using the various detectors. Note that the minimum allowable inter-vehicular distance is usually set to be longer as the vehicle speed of the motorcycle 100 is increased. Then, the determination section 22 determines whether the inter-vehicular distance between the motorcycle 100 and the preceding vehicle is shorter than the minimum allowable inter-vehicular distance for the reference duration or longer. If Yes, the processing proceeds to step S303. If No, the processing returns to step S301.

(Control Step)

In step S303 to step S307, the control section 23 makes the warning device 30 output the warning in a mode that corresponds to the posture information acquired in step S301.

More specifically, in step S303, the control section 23 determines whether the posture information acquired in step S301 is the posture information corresponding to the bank angle θL that is smaller than the maximum allowable bank angle θLth1. If Yes, the processing proceeds to step S304. If No, the processing proceeds to step S307.

In step S304, the control section 23 determines whether the posture information acquired in step S301 is the posture information corresponding to the bank angle θL that is smaller than the reference bank angle θLth2. Note that the reference bank angle θLth2 is the smaller angle than the maximum allowable bank angle θLth1. If Yes, the processing proceeds to step S305. If No, the processing proceeds to step S306.

In step S305, the control section 23 makes the warning device 30 perform a similar operation to that in step S204 in FIG. 5. In step S306, the control section 23 makes the warning device 30 perform a similar operation to that in step S205 in FIG. 5. In step S307, the control section 23 makes the warning device 30 perform a similar operation to that in step S105 in FIG. 4.

<Effects of Inter-Vehicular Distance Warning System>

A description will be made on effects of the inter-vehicular distance warning system according to the third embodiment.

In the case where the acquisition section 21 acquires the posture information corresponding to the bank angle θL that is smaller than the reference bank angle θLth2, the control section 23 preferably makes the warning device 30 output the first warning. In the case where the acquisition section 21 acquires the posture information corresponding to the bank angle θL that is larger than the reference bank angle θLth2 and is smaller than the maximum allowable bank angle θLth1, the control section 23 preferably makes the warning device 30 output the second warning that differs from the first warning. In the case where the acquisition section 21 acquires the posture information corresponding to the bank angle θL that is larger than the maximum allowable bank angle θLth1, the control section 23 preferably does not make the warning device 30 output the warning. Therefore, the assistance in the rider's operation can further reliably be improved while the rider's safety is improved.

The description has been made so far on the first embodiment to the third embodiment. However, the invention is not limited to the description of each of the embodiments. For example, only a part of each of the embodiments may be implemented, or all or parts of the embodiments may be combined. In addition, all or parts of the steps in each of the operation flows may be executed in a different order. For example, the acquisition of the posture information related to the bank angle θL in the acquisition steps S101, S201, S301 may be executed after the determination steps S102, S202, S302. Furthermore, in the second embodiment and the third embodiment, the two types of the warnings are used differently by using the reference bank angle θLth2. However, three or more types of the warnings may be used differently.

REFERENCE SIGNS LIST

1: Inter-vehicular distance warning system
11: Environment detector
12: Inertial measurement unit
20: Processing unit
21: Acquisition section
22: Determination section
23: Control section
30: Warning device
100: Motorcycle
θL: Bank angle
θLth1: Maximum allowable bank angle
θLth2: Reference bank angle

The invention claimed is:

1. A processing unit for an inter-vehicular distance warning system that recognizes insufficiency of an inter-vehicular distance between a traveling motorcycle and a preceding vehicle by using an environment detector provided in said motorcycle and warns a rider of said motorcycle, the processing unit comprising:
an acquisition section that acquires environment information corresponding to output of the environment detector;
a determination section that determines sufficiency or insufficiency of the inter-vehicular distance on the basis of the environment information; and
a control section that makes a warning device output a warning in the case where the determination section determines that the inter-vehicular distance is insufficient, wherein during travel of the motorcycle,
the acquisition section acquires posture information related to a bank angle of the motorcycle, and
the control section changes the warning output by the warning device in accordance with the posture information.

2. The processing unit according to claim 1, wherein during the travel of the motorcycle,
the control section makes the warning device output the warning in the case where the acquisition section acquires the posture information corresponding to the bank angle that is smaller than a maximum allowable bank angle, and does not make the warning device output the warning in the case where the acquisition section acquires the posture information corresponding to the bank angle that is larger than the maximum allowable bank angle.

3. The processing unit according to claim 2, wherein during the travel of the motorcycle,
the control section makes the warning device output the warning in the case where a state where the determination section determines that the inter-vehicular distance is insufficient and the acquisition section acquires the posture information corresponding to the bank angle that is larger than the maximum allowable bank angle continues for reference duration or longer.

4. The processing unit according to claim 1, wherein during the travel of the motorcycle,
the control section makes the warning device output a first warning in the case where the acquisition section acquires the posture information corresponding to the bank angle that is smaller than a reference bank angle, and makes the warning device a second warning that differs from the first warning in the case where the acquisition section acquires the posture information corresponding to the bank angle that is larger than the reference bank angle.

5. The processing unit according to claim 4, wherein the second warning is a warning with lower sensitivity than the first warning.

6. The processing unit according to claim 5, wherein the second warning is a warning whose sensitivity is gradually improved.

7. The processing unit according to claim 5, wherein the second warning is a warning whose intensity of output is lower than the first warning.

8. The processing unit according to claim 5, wherein the second warning is a warning that is output in a change pattern of a longer cycle than the first warning.

9. The processing unit according to claim 4, wherein the second warning is a warning that is sensed by the rider through a different sensory organ from a sensory organ used for the first warning.

10. The processing unit according to claim 9, wherein the first warning is a warning that applies an external force to the rider, and
the second warning is a warning that does not apply the external force to the rider.

11. The processing unit according to claim 9, wherein during the travel of the motorcycle,
the control section makes the warning device output the first warning and a third warning that is sensed by the rider through a different sensory organ from the sensory organ used for said first warning in the case where the acquisition section acquires the posture information corresponding to the bank angle that is smaller than the reference bank angle, and does not make the warning device output the third warning in the case where the acquisition section acquires the posture information corresponding to the bank angle that is larger than the reference bank angle.

12. The processing unit according to claim 11, wherein the second warning and the third warning are warnings that are sensed by the rider through the same sensory organ.

13. An inter-vehicular distance warning system (1) comprising:
the processing unit according to claim 1;
the environment detector; and
the warning device.

14. A motorcycle comprising:
the inter-vehicular distance warning system according to claim 13.

15. A processing method for an inter-vehicular distance warning system that recognizes insufficiency of an inter-vehicular distance between a traveling motorcycle and a preceding vehicle by using an environment detector provided in said motorcycle and warns a rider, the processing method comprising:
an acquisition step of acquiring environment information corresponding to output of the environment detector (11);
a determination step of determining sufficiency or insufficiency of the inter-vehicular distance on the basis of the environment information; and
a control step of making a warning device output a warning in the case where it is determined that the inter-vehicular distance is insufficient in the determination step, wherein
during travel of the motorcycle,
in the acquisition step, posture information related to a bank angle of the motorcycle is acquired, and
in the control step, the warning output by the warning device is changed in accordance with the posture information.

* * * * *